United States Patent
Suzuki et al.

(10) Patent No.: US 11,930,265 B2
(45) Date of Patent: Mar. 12, 2024

(54) PHOTOGRAPHING APPARATUS, PHOTOGRAPHING METHOD, AND STORAGE MEDIUM HAVING PROGRAM STORED THEREIN

(71) Applicant: NEC Corporation, Tokyo (JP)

(72) Inventors: Teito Suzuki, Tokyo (JP); Masatoshi Takeda, Tokyo (JP); Ryo Hachiya, Tokyo (JP)

(73) Assignee: NEC CORPORATION, Tokyo (JP)

( * ) Notice: Subject to any disclaimer, the term of this patent is extended or adjusted under 35 U.S.C. 154(b) by 190 days.

(21) Appl. No.: 17/435,495

(22) PCT Filed: Mar. 6, 2020

(86) PCT No.: PCT/JP2020/009582
§ 371 (c)(1),
(2) Date: Sep. 1, 2021

(87) PCT Pub. No.: WO2020/179898
PCT Pub. Date: Sep. 10, 2020

(65) Prior Publication Data
US 2022/0141380 A1 May 5, 2022

(30) Foreign Application Priority Data
Mar. 7, 2019 (JP) ................. 2019-041795

(51) Int. Cl.
*H04N 23/611* (2023.01)
*G03B 15/03* (2021.01)
*H04N 23/56* (2023.01)

(52) U.S. Cl.
CPC ........... *H04N 23/611* (2023.01); *G03B 15/03* (2013.01); *H04N 23/56* (2023.01)

(58) Field of Classification Search
CPC .... H04N 23/611; H04N 23/56; H04N 23/667; H04N 23/74; G03B 15/03; G03B 17/38; G03B 15/05; G06V 40/161
See application file for complete search history.

(56) References Cited

U.S. PATENT DOCUMENTS 10,200,623 B1 * 2/2019 Baldwin ............... H04N 23/63
2008/0079819 A1 4/2008 Uchida
(Continued)

FOREIGN PATENT DOCUMENTS

CN 109104554 A 12/2018
JP 2001-174884 A 6/2001
(Continued)

OTHER PUBLICATIONS

Indian Office Action for IN Application No. 202117039433 dated Mar. 9, 2022.
(Continued)

*Primary Examiner* — Yogesh K Aggarwal
(74) *Attorney, Agent, or Firm* — Sughrue Mion, PLLC

(57) ABSTRACT

A photographing apparatus includes a camera; a light-emitting device provided in the vicinity of the camera; a human sensor that detects a photographic subject; first light emission control means for controlling light emission of the light-emitting device in accordance with a first mode when the photographic subject is detected; detection means for detecting that a photograph-taking timing has arrived when an interocular distance of the photographic subject in an image generated by the camera in accordance with the first mode becomes at least a prescribed distance; and second light emission control means for controlling light emission of the light-emitting device, at the photograph-taking timing, in accordance with a second mode in which a light emission intensity is higher than in the first mode.

11 Claims, 5 Drawing Sheets

(56) References Cited

U.S. PATENT DOCUMENTS

| | | |
|---|---|---|
| 2013/0314581 A1 | 11/2013 | Kido |
| 2016/0335495 A1 | 11/2016 | Kim et al. |
| 2017/0208237 A1 | 7/2017 | Nagata et al. |
| 2018/0315288 A1 | 11/2018 | Kim |
| 2019/0171804 A1* | 6/2019 | Lee .................. G06F 21/32 |

FOREIGN PATENT DOCUMENTS

| | | |
|---|---|---|
| JP | 2003-107567 A | 4/2003 |
| JP | 2003-177459 A | 6/2003 |
| JP | 2007-004612 A | 1/2007 |
| JP | 2007-025154 A | 2/2007 |
| JP | 2008-139973 A | 6/2008 |
| JP | 2008-199522 A | 8/2008 |
| JP | 2010-086350 A | 1/2012 |
| JP | 2013-242504 A | 12/2013 |
| JP | 2016-042705 A | 3/2016 |
| JP | 2018-005135 A | 1/2018 |
| JP | 7151867 B2 | 10/2022 |
| TW | 200917816 A | 4/2009 |

OTHER PUBLICATIONS

International Search Report for PCT Application No. PCT/JP2020/009582, dated May 26, 2020.
Extended European Search Report for EP Application No. 20766747.8 dated Apr. 14, 2022.
Chinese Office Action for CN Application No. 202080019142.6, dated Oct. 25, 2022 with English Translation.
JP Office Action for JP Application No. 2022-156129 , dated Jun. 27, 2023 with English Translation.

* cited by examiner ial Stage Entry of PCT/JP2020/

PHOTOGRAPHING APPARATUS, PHOTOGRAPHING METHOD, AND STORAGE MEDIUM HAVING PROGRAM STORED THEREIN

This application is a National Stage Entry of PCT/JP2020/009582 filed on Mar. 6, 2020, which claims priority from Japanese Patent Application 2019-041795 filed on Mar. 7, 2019, the contents of all of which are incorporated herein by reference, in their entirety.

TECHNICAL FIELD

The present disclosure relates to a photographing apparatus, a photographing method, and a storage medium having a program stored therein.

BACKGROUND ART

A technology for improving authentication efficiency when performing facial authentication by generating light, sounds, or the like towards a walking photographic subject to make the photographic subject face a camera installation position is disclosed in Patent Document 1 (Japanese Unexamined Patent Application, First Publication No. 2010-086350).

CITATION LIST

Patent Literature

SUMMARY

Problems to be Solved

However, with the technology described in Patent Document 1, there is a problem in that an image suitable for facial authentication sometimes cannot be photographed due to the distance from the camera to the photographic subject or the brightness of the surroundings.

Therefore, an example of an objective of the present disclosure is to provide a photographing apparatus, a photographing method, and a storage medium having a program stored therein, which solve the above-mentioned problem.

Means for Solving the Problems

According to a first aspect of the present disclosure, a photographing apparatus includes a camera; a light-emitting device provided in the vicinity of the camera; a human sensor that detects a photographic subject; first light emission control means for controlling light emission of the light-emitting device in accordance with a first mode when the photographic subject is detected; detection means for detecting that a photograph-taking timing has arrived when an interocular distance of the photographic subject in an image generated by the camera in accordance with the first mode becomes at least a prescribed distance; and second light emission control means for controlling light emission of the light-emitting device, at the photograph-taking timing, in accordance with a second mode in which a light emission intensity is higher than in the first mode.

According to a second aspect of the present disclosure, a photographing method includes controlling light emission of a light-emitting device provided in the vicinity of a camera in accordance with a first mode when a photographic subject is detected by a human sensor; detecting that a photograph-taking timing has arrived when an interocular distance of the photographic subject in an image generated by the camera in accordance with the first mode becomes at least a prescribed distance; and controlling light emission of the light-emitting device, at the photograph-taking timing, in accordance with a second mode in which a light emission intensity is higher than in the first mode.

According to a third aspect of the present disclosure, a program stored in a storage medium causes a computer in a photographing apparatus to execute processes. The processes includes controlling light emission of a light-emitting device provided in the vicinity of a camera in accordance with a first mode when a photographic subject is detected by a human sensor; detecting that a photograph-taking timing has arrived when an interocular distance of the photographic subject in an image generated by the camera in accordance with the first mode becomes at least a prescribed distance; and controlling light emission of the light-emitting device, at the photograph-taking timing, in accordance with a second mode in which a light emission intensity is higher than in the first mode.

Advantageous Effects

According to the present disclosure, an image that is suitable for facial authentication of a photographic subject who is advancing towards a camera can be photographed.

EXAMPLE EMBODIMENT

Hereinafter, a photographing apparatus according to an embodiment of the present disclosure will be explained with reference to the drawings.

Figure 1:
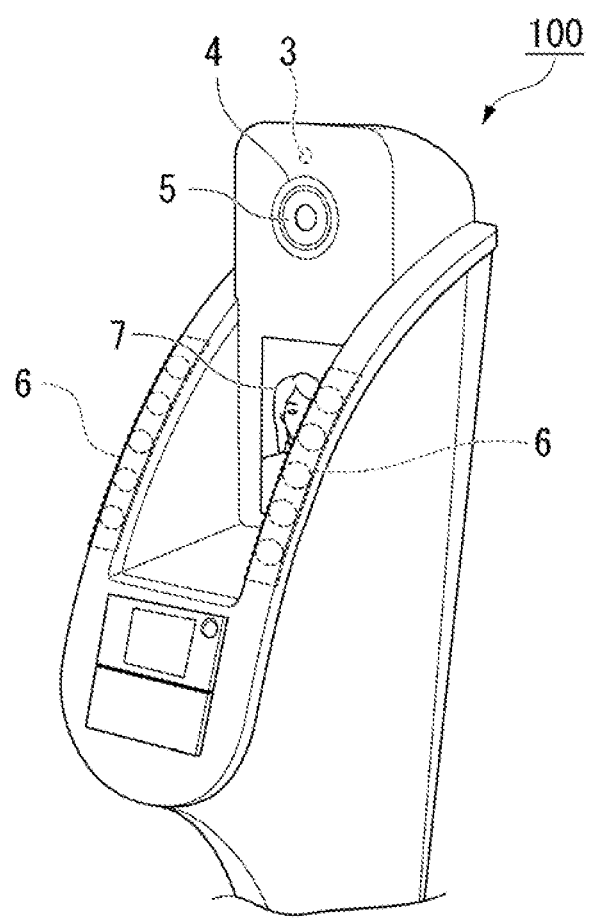
FIG. 1 is a perspective view illustrating the outer appearance of a photographing apparatus according to the present embodiment.

FIG. 1 is a perspective view illustrating the outer appearance of a photographing apparatus according to the present embodiment.

The photographing apparatus 100 is, for example, an apparatus incorporated into an entry/exit management system or the like for managing the entry and exit of people by facial authentication. The photographing apparatus 100 takes photographs of people who are entering or exiting a site. The photographing apparatus 100 is installed, for example, at a position at which photographs of the faces of entering or exiting people can be taken at an entrance/exit to a building, a property, or the like.

As illustrated in FIG. 1, the photographing apparatus 100 is configured so as to include a human sensor 3, a light-emitting device 4, a camera 5, slope LEDs (Light-Emitting Diodes) 6, and a display 7.

The human sensor 3 detects a photographic subject in front of the photographing apparatus 100 by means of, for example, an infrared sensor or the like. The area in front of the photographing apparatus 100 is the direction in which the camera takes photographs.

The camera 5 takes a photograph of the photographic subject in front of the photographing apparatus 100.

The light-emitting device 4 is provided in the vicinity of the camera 5. For example, the light-emitting device 4 is composed of a plurality of light-emitting bodies (for example, LEDs) that are installed in a ring along the circumferential direction around a lens of the camera 5. The light-emitting device 4 serves the function of drawing the photographic subject's attention towards the camera 5 and the function of a flash for the camera 5.

The slope LEDs 6 are one or a plurality of light-emitting bodies installed on each of left and right slopes on the photographing apparatus 100. The slope LEDs 6 provide notification of the results of facial authentication.

The display 7 is a display apparatus such as a liquid crystal display or an organic EL (Electro-Luminescence) display. The display 7 displays an image taken by the camera 5.

Figure 2:
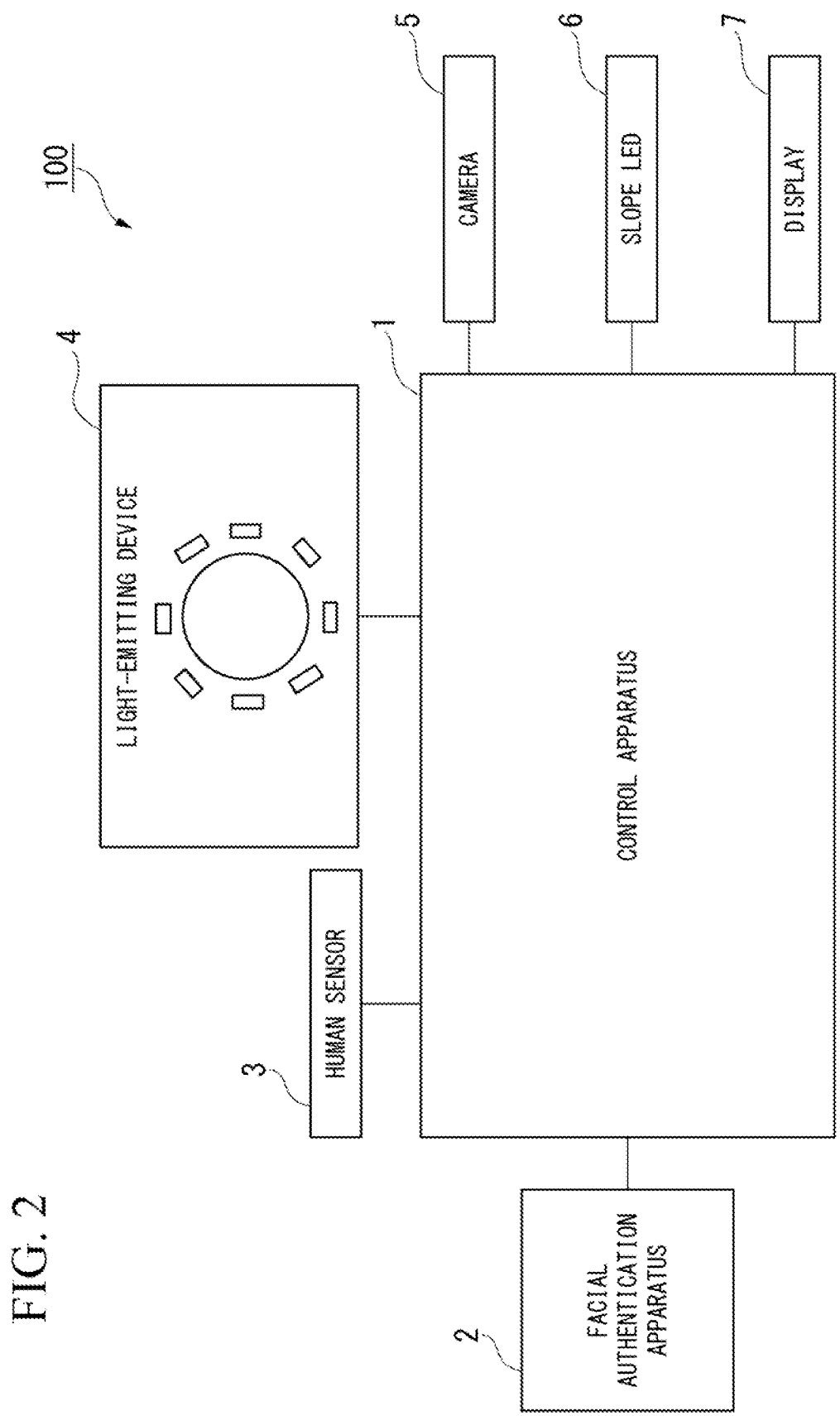
FIG. 2 is a block diagram indicating the structure of the photographing apparatus according to the present embodiment.

FIG. 2 is a block diagram indicating the structure of the photographing apparatus.

The photographing apparatus 100 is provided with at least a control apparatus 1, a facial authentication apparatus 2, the human sensor 3, the light-emitting device 4, the camera 5, the slope LEDs 6, and the display 7.

The facial authentication apparatus 2 is a facial authentication engine that performs facial authentication by collating a facial photograph image of the photographic subject, taken by the camera 5 at a photograph-taking timing, with pre-stored facial photograph images of registrants. The registrants are, for example, people who are authorized to enter or exit a site.

Figure 3:
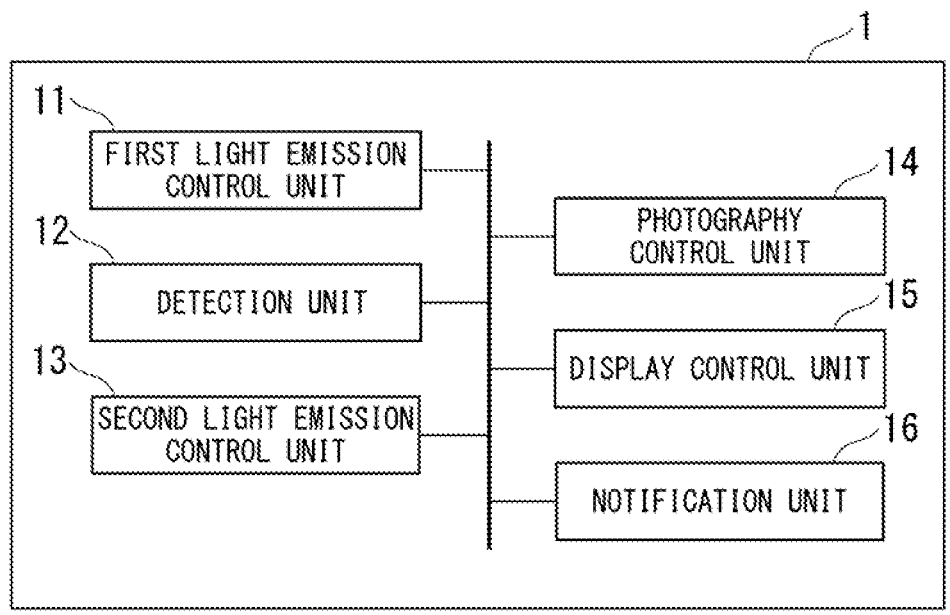
FIG. 3 is a functional configuration diagram of the photographing apparatus according to the present embodiment.

FIG. 3 is a functional configuration diagram of the control apparatus.

The control apparatus 1 controls the light emission of the light-emitting device 4 and the slope LEDs 6. The control apparatus 1 starts when a power source is connected, and executes a pre-stored photographing program. As a result thereof, the control apparatus 1 is provided with at least a first light emission control unit 11, a detection unit 12, a second light emission control unit 13, a photography control unit 14, a display control unit 15, and a notification unit 16.

When a photographic subject is detected, the first light emission control unit 11 controls the light emission of the light-emitting device 4 in accordance with a first mode for drawing the photographic subject's attention towards the camera 5. For example, the first mode involves blinking blue light.

The detection unit 12 detects that a photograph-taking timing has arrived when the interocular distance of the photographic subject in an image generated by the camera 5 in accordance with the first mode becomes at least a prescribed distance.

The second light emission control unit 13 controls the light emission of the light-emitting device 4, at the photograph-taking timing, in accordance with a second mode in which the light emission intensity is higher than in the first mode. For example, the second mode, for functioning as a flash for the camera 5, involves emitting white light at a brightness higher than that in the first mode.

The photography control unit 14 acquires an image taken by the camera 5 at the photograph-taking timing for use in facial authentication, and outputs the acquired image to the facial authentication apparatus 2.

The display control unit 15 controls a display on the display 7.

The notification unit 16 controls the light emission of the slope LEDs 6 to provide notification of authentication results of the facial authentication in the facial authentication apparatus 2.

Figure 4:
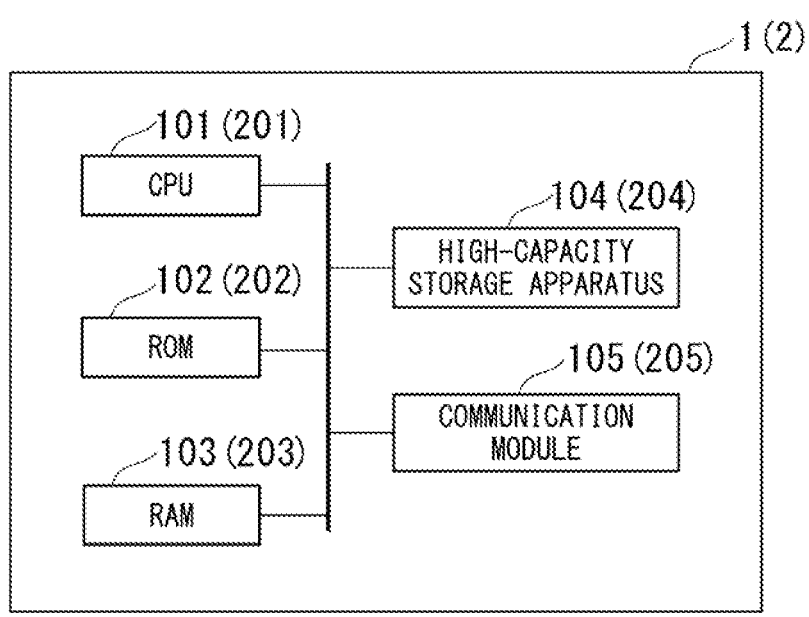
FIG. 4 is a hardware configuration diagram of a control apparatus and a facial authentication apparatus according to the present embodiment.

FIG. 4 is a hardware configuration diagram of the control apparatus and the facial authentication apparatus.

As indicated by the drawing, the control apparatus 1 (facial authentication apparatus 2) is a computer provided with hardware such as a CPU (Central Processing Unit) 101 (201), a ROM (Read-Only Memory) 102 (202), a RAM (Random Access Memory) 103 (203), a high-capacity storage apparatus 104 (204), and a communication module 105 (205).

Figure 5:
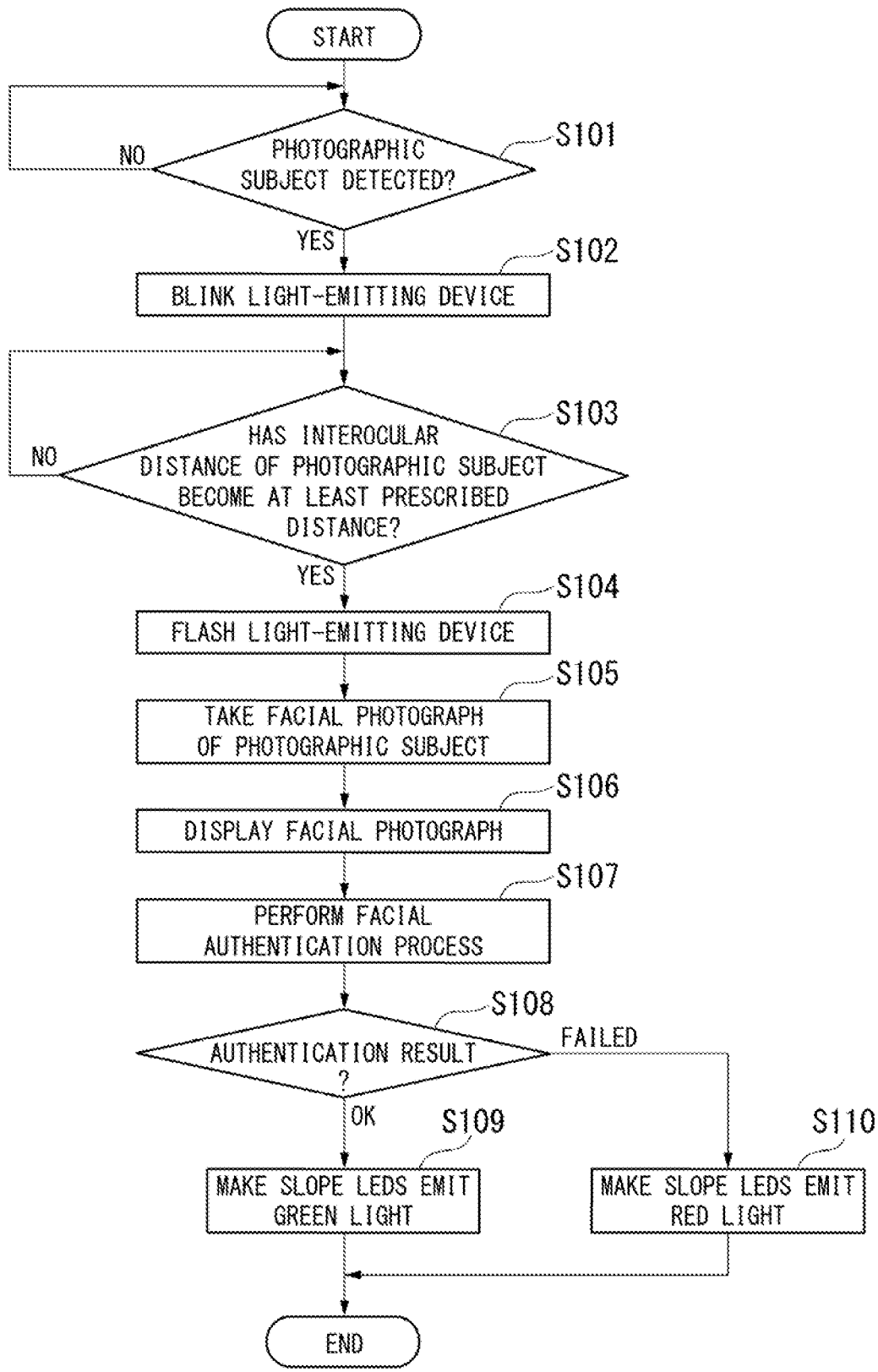
FIG. 5 is a diagram indicating the processing flow in the photographing apparatus according to the present embodiment.

FIG. 5 is a diagram indicating the processing flow in the photographing apparatus.

Next, the processing flow in the photographing apparatus will be explained in order.

First, the first light emission control unit 11 in the photographing apparatus 100 determines whether or not the human sensor 3 has detected a photographic subject (step S101). If the human sensor 3 has not detected a photographic subject (step S101; No), then the first light emission control unit 11 repeats the process in step S101.

On the other hand, if the human sensor 3 has detected a photographic subject (step S101; Yes), then the first light emission control unit 11 makes the light-emitting device 4 blink blue light (light emission is controlled under the first mode) (step S102). As a result thereof, the photographic subject's attention can be drawn towards the camera 5 so that the facial orientation or the line of sight of the photographic subject is directed towards the camera 5. The photography control unit 14 instructs the camera 5 to take a photograph during light emission control in accordance with the first mode. The photography control unit 14 may instruct the camera 5 to take photographs multiple times. As a result thereof, one or more sets of image data including images of the photographic subject in a state in which the photographic subject's attention is drawn towards the camera 5 can be generated. In other words, image data of the photographic subject in a state facing directly towards the camera 5 can be acquired.

Next, if an image photographed and generated by the camera 5 in accordance with the first mode includes portions that can be recognized to be both irises of the photographic subject, then the detection unit 12 determines that the facial orientation of the photographic subject is directly towards the camera 5. The detection unit 12 computes the interocular distance of the photographic subject in the image including the portions that can be recognized to be both irises. The interocular distance is the distance between the left iris and the right iris. The detection unit 12 determines whether or not the interocular distance in the image has become at least a prescribed distance (step S103).

If the interocular distance in the image photographed by the camera 5 has become at least the prescribed distance, then the following assumptions can be made: the photographic subject is facing directly towards the camera 5; the photographic subject is advancing towards the camera 5; and the distance from the camera 5 to the photographic subject is a distance (for example, 60 cm to 120 cm, etc.) suitable for photographing an image (facial photograph) to be used for performing facial authentication. The detection unit 12 can estimate the distance from the camera 5 to the photographic subject corresponding to the interocular distance in the image based, for example, on statistical information regarding interocular distances or the like. Therefore, the detection unit 12 can estimate the distance from the camera 5 to the photographic subject when the interocular distance has become at least the prescribed distance. The detection unit 12 determines that the distance from the photographic subject to the apparatus has become a distance suitable for taking a photograph when the interocular distance becomes at least the prescribed distance. Thus, if the interocular distance has become at least the prescribed distance (step S103; Yes), then the detection unit 12 detects that the photograph-taking timing has arrived.

On the other hand, if the interocular distance has not become at least the prescribed distance (step S103; Yes), then the detection unit 12 repeats the process in step S103.

The second light emission control unit 13 makes the light-emitting device 4 function as a flash for the camera 5, at the photograph-taking timing, by emitting white light having a brightness greater than in the first mode (light emission is controlled under the second mode in which the light emission intensity is higher than in the first mode) (step S104). As a result thereof, the photographic subject's face can be brightly lit to take a facial photograph suitable for facial authentication. The photography control unit 14 acquires a facial photograph image of the photographic subject taken by the camera 5 at the photograph-taking timing for use in facial authentication (step S105). In other words, the photography control unit 14 instructs the camera 5 to take a photograph when light emission is controlled in accordance with the second mode at the photograph-taking timing. As a result thereof, image data taken in a state in which the light emission intensity is high and in which the photographic subject is positioned within a prescribed distance range from the camera 5 and is facing directly towards the camera 5 can be acquired. The photography control unit 14 acquires the generated image data. The display control unit 15 displays, on the display 7, the facial photograph image that has been photographed and generated at the photograph-taking timing by the camera 5 (step S106).

The photography control unit 14 outputs the acquired facial photograph image (image data including a facial image) to the facial authentication apparatus 2. The facial authentication apparatus 2 executes a facial authentication process for verifying that the photographic target is a registrant by collating the input image with pre-stored facial photograph images of registrants (step S107). In other words, the facial authentication apparatus 2 determines whether or not the photographic subject is the same person as a registrant by collating the image data including the facial image of the photographic subject with the pre-stored image data including the facial images of registrants.

The facial authentication apparatus 2 outputs the authentication result to the control apparatus 1. The authentication result is "OK" if the photographic subject is a registrant and is "Failed" if the photographic subject is not a registrant. The notification unit 16 in the control apparatus 1 determines whether or not the authentication result input from the facial authentication apparatus 2 is "OK" or "Failed" (step S108).

If the authentication result is "OK", then the notification unit 16 makes the slope LEDs 6 emit green light (step S109). As a result thereof, the photographic subject can be notified that the authentication result is "OK". Thereafter, the process ends. On the other hand, if the authentication result is "Failed", then the notification unit 16 makes the slope LEDs 6 emit red light (step S110). As a result thereof, the photographic subject can be notified that the authentication result is "Failed". Thereafter, the process ends.

In the above-described process, the notification unit 16 may provide notification of the authentication results by outputting the authentication results in audio form from a speaker (not illustrated).

Additionally, in the above-described process, the first light emission control unit 11 draws the photographic subject's attention towards the camera 5 by making the light-emitting device 4 blink blue light. However, the light emission mode is not limited thereto. Other light emission modes may be used as long as they are able to draw the photographic subject's attention towards the camera 5.

Additionally, in the above-described process, the detection unit 12 detects that the photograph-taking timing has arrived when the interocular distance becomes at least a prescribed distance. However, in addition thereto, it can be determined that the photograph-taking timing has arrived when the photographic subject's line of sight is oriented directly towards the camera 5.

According to the above-described process, the photographic subject's face can be brightly lit and photographed when the photographic subject's face is oriented directly towards the camera 5 and the distance from the photographic subject to the camera 5 has become a prescribed distance. Thus, an image that is suitable for facial authentication of the photographic subject who is advancing towards the camera 5 can be photographed. An image that is suitable for facial authentication is a facial photograph image of a prescribed size, in which the photographic subject's face is brightly captured, without shadows, and with the face or the line of sight oriented directly towards the camera 5.

Additionally, according to the above-described process, when the first light emission control unit 11 has detected a photographic subject, the light-emitting device 4 controls light emission in the first mode. For this reason, the photographic subject's attention can be directed towards the camera 5, and the orientation of the face or the orientation of the line of sight of the photographic subject can be directed towards the camera 5.

Although a method, for example, in which an arrow pointing towards the camera 5 is displayed on the display 7 or the like to draw the photographic subject's attention towards the camera 5 might be contemplated, in this case, the photographic subject often does not notice or is late to notice the arrow. Additionally, in this case, the photographic subject first looks at the arrow and then looks at the camera 5. Thus, some time passes before the photographic subject's attention is turned towards the camera 5, and this time causes a delay in facial authentication.

In contrast therewith, with the above-described photographing apparatus 100, the light-emitting device 4, which is provided near the camera 5, is illuminated. For this reason, the photographic subject can more easily notice the camera 5 in comparison with an arrow, and the photographic subject's attention can immediately be drawn to the camera 5.

Additionally, according to the above-described process, the detection unit 12 detects that the photograph-taking timing has arrived when the interocular distance of the photographic subject becomes at least the prescribed distance based on the distance from the photographic subject to the apparatus. For this reason, a time at which the photographic subject's face is oriented directly towards the camera 5 and the distance from the photographic subject to the photographing apparatus 100 has become a distance suitable for photographing an image to be used for facial authentication can be identified as the photograph-taking timing. Furthermore, people other than those advancing towards the photographing apparatus 100, such as people crossing in front of the photographing apparatus 100, can be excluded from the facial authentication targets.

Additionally, according to the above-described process, the second light emission control unit 13 controls the light emission of the light-emitting device 4, at the photograph-taking timing, in accordance with a second mode in which the light emission intensity is higher than in the first mode. For this reason, the photographic subject's face can be brightly lit to take a facial photograph image suitable for facial authentication.

Additionally, according to the above-described process, the light-emitting device 4 for directing the photographic subject's attention towards the camera 5 also functions as a flash. For this reason, there is no need to install a separate light-emitting device for use as a flash, and the cost can be reduced. In other words, the drawing of the photographic subject's attention and the construction of an illuminated environment suitable for facial authentication can be realized with a single light-emitting device 4 being used in a sequence.

While an embodiment of the present disclosure has been described above, this disclosure is not limited to the above-described embodiment, and various modifications may be made within a scope not departing from the spirit of the present disclosure.

For example, in the above-described embodiment, a case in which the light-emitting device 4 is composed of a plurality of light-emitting bodies that are installed in a ring along the circumferential direction around a lens of the camera 5 was explained. However, the structure is not limited thereto. The light-emitting device 4 need only be installed in the vicinity of the camera 5, and for example, may be composed of a plurality of light-emitting bodies installed in a square around the lens of the camera. Additionally, the light-emitting device 4 may be composed of a single light-emitting body.

Figure 6:
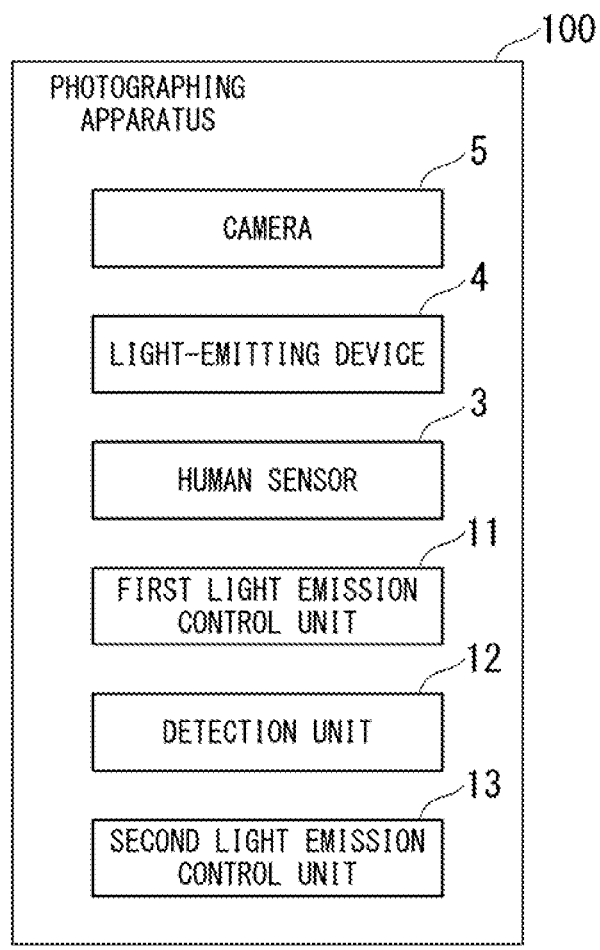
FIG. 6 is a diagram indicating the minimum configuration of the photographing apparatus according to the present embodiment.

FIG. 6 is a diagram indicating the minimum configuration of the photographing apparatus.

The photographing apparatus 100 need only be provided with at least a camera 5, a light-emitting device 4, a human sensor 3, a first light emission control unit 11, a detection unit 12, and a second light emission control unit 13.

The light-emitting device 4 is provided in the vicinity of the camera 5.

The human sensor 3 detects a photographic subject.

The first light emission control unit 11 controls the light emission of the light-emitting device 4 in accordance with a first mode when the photographic subject is detected.

The detection unit 12 detects that a photograph-taking timing has arrived when an interocular distance of the photographic subject in an image generated by the camera 5 in accordance with the first mode becomes at least a prescribed distance.

The second light emission control unit 13 controls the light emission of the light-emitting device 4, at the photograph-taking timing, in accordance with a second mode in which the light emission intensity is higher than in the first mode.

The control apparatus 1 and the facial authentication apparatus 2 described above have computer systems contained therein. Furthermore, the steps in the above-described process are stored in a computer-readable recording medium in the form of a program, and the above-described process is performed by a computer reading out and executing this program. In this case, the computer-readable recording medium refers to a magnetic disc, a magneto-optic disc, a CD-ROM, a DVD-ROM, a semiconductor memory device, or the like. Additionally, this computer program may be transmitted to a computer by means of a communication line and the computer that has received this transmission may execute said program.

Additionally, the above-mentioned program may be for realizing a portion of the aforementioned functions. Furthermore, the program may be in the form of a so-called difference file (difference program) that can realize the aforementioned functions by being combined with a program that is already recorded in a computer system.

The present application claims the benefit of priority based on Japanese Patent Application No. 2019-041795, filed Mar. 7, 2019, the entire disclosure of which is incorporated herein by reference.

INDUSTRIAL APPLICABILITY

According to the present disclosure, an image that is suitable for facial authentication of a photographic subject who is advancing towards a camera can be photographed.

REFERENCE SIGNS LIST

100 Photographing apparatus
1 Control apparatus
11 First light emission control unit
12 Detection unit
13 Second light emission control unit
14 Photography control unit
15 Display control unit
16 Notification unit
2 Facial authentication apparatus
3 Human sensor
4 Light-emitting device
5 Camera
6 Slope LED
7 Display

What is claimed is:
1. A photographing apparatus comprising:
a camera;
a light-emitter provided in the vicinity of the camera;
a motion sensor that detects a photographic subject;
at least one memory configured to store instructions; and
at least one processor configured to execute the instructions to:
control light emission of the light-emitter in accordance with a first mode for drawing the photographic subject's attention towards the camera by blinking the light-emitter when the photographic subject is detected;
detect that a photograph-taking timing has arrived when an interocular distance of the photographic subject, being made to face the camera by controlling the light emission in accordance with the first mode, in an image generated by the camera in accordance with the first mode becomes at least a prescribed distance; and
control light emission of the light-emitter, at the photograph-taking timing, in accordance with a second mode in which a light emission intensity is higher than in the first mode.

2. The photographing apparatus according to claim 1,
wherein the at least one processor is further configured to execute the instructions to:
acquire an image photographed and generated by the camera at the photograph-taking timing for use in facial authentication.

3. The photographing apparatus according to claim 1,
wherein the at least one processor is configured to execute the instructions to:
control the light emission of the light-emitter in accordance with the second mode for functioning as a flash for the camera.

4. The photographing apparatus according to claim 1, wherein
the light-emitter includes a plurality of light-emitting bodies installed in a ring around a lens of the camera.

5. The photographing apparatus according to claim 1,
wherein the at least one processor is configured to execute the instructions to:
determine that a distance from the photographic subject to the photographing apparatus has become suitable for taking a photograph when the interocular distance of the photographic subject in the image becomes at least the prescribed distance.

6. The photographing apparatus according to claim 1,
wherein the at least one processor is further configured to execute the instructions to:
verify an image photographed and generated by the camera at the detected photograph-taking timing with a facial image of a registrant stored in advance, and determine whether or not the photographic subject in the image is the same person as the registrant; and
notify a result of the determining.

7. The photographing apparatus according to claim 1,
wherein the at least one processor is configured to execute the instructions to control the light emission in accordance with the second mode in which a color emitted is different from the first mode.

8. The photographing apparatus according to claim 1, wherein
the photograph-taking timing is detected based on the image generated according to the controlling of the light emission in accordance with the first mode.

9. The photographing apparatus according to claim 1,
wherein the at least one processor is configured to execute the instructions to:
control the light emission in accordance with the first mode of blinking the light-emitter, and
control the light emission in accordance with the second mode of turning on the light-emitter at the light emission intensity that is higher than in the first mode.

10. A photographing method comprising:
controlling light emission of a light-emitter provided in the vicinity of a camera in accordance with a first mode for drawing the photographic subject's attention towards the camera by blinking the light-emitter when a photographic subject is detected by a motion sensor;
detecting that a photograph-taking timing has arrived when an interocular distance of the photographic subject, being made to face the camera by controlling the light emission in accordance with the first mode, in an image generated by the camera in accordance with the first mode becomes at least a prescribed distance; and
controlling light emission of the light-emitter, at the photograph-taking timing, in accordance with a second mode in which a light emission intensity is higher than in the first mode.

11. A non-transitory computer-readable storage medium storing a program that causes a computer in a photographing apparatus to execute processes, the processes comprising:
controlling light emission of a light-emitter provided in the vicinity of a camera in accordance with a first mode for drawing the photographic subject's attention towards the camera by blinking the light-emitter when a photographic subject is detected by a motion sensor;
detecting that a photograph-taking timing has arrived when an interocular distance of the photographic subject, being made to face the camera by controlling the light emission in accordance with the first mode, in an image generated by the camera in accordance with the first mode becomes at least a prescribed distance; and
controlling light emission of the light-emitter, at the photograph-taking timing, in accordance with a second mode in which a light emission intensity is higher than in the first mode.

* * * * *